(12) United States Patent
Homma et al.

(10) Patent No.: US 9,122,922 B2
(45) Date of Patent: Sep. 1, 2015

(54) INFORMATION PROCESSING APPARATUS, PROGRAM, AND INFORMATION PROCESSING METHOD

(75) Inventors: Fuminori Homma, Tokyo (JP); Ken Miyashita, Tokyo (JP); Shoichiro Moriya, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 13/484,945

(22) Filed: May 31, 2012

(65) Prior Publication Data

US 2012/0314953 A1    Dec. 13, 2012

(30) Foreign Application Priority Data

Jun. 7, 2011    (JP) ................. 2011-127446

(51) Int. Cl.
*G06K 9/34*    (2006.01)
*G06K 9/00*    (2006.01)
*G06T 7/00*    (2006.01)

(52) U.S. Cl.
CPC .......... *G06K 9/00476* (2013.01); *G06T 7/0081* (2013.01)

(58) Field of Classification Search
USPC ........................................ 382/173, 176, 281
See application file for complete search history.

(56) References Cited

U.S. PATENT DOCUMENTS

| | | | |
|---|---|---|---|
| 5,629,989 A * | 5/1997 | Osada ........................... | 382/281 |
| 5,771,342 A * | 6/1998 | Todd ............................. | 345/660 |
| 5,845,288 A * | 12/1998 | Syeda-Mahmood ................. | 1/1 |
| 7,298,382 B1 * | 11/2007 | Tanaguchi et al. ............ | 345/619 |
| 8,429,174 B2 * | 4/2013 | Ramani et al. ................ | 707/749 |
| 2007/0046645 A1 * | 3/2007 | Hirota et al. ................. | 345/173 |
| 2010/0253790 A1 * | 10/2010 | Hayasaki ................... | 348/207.2 |
| 2011/0211755 A1 * | 9/2011 | Xu ................................. | 382/165 |
| 2013/0243250 A1 * | 9/2013 | France et al. ................. | 382/103 |

OTHER PUBLICATIONS

European Search Report in Application 12169750.2 dated Sep. 26, 2012, 8 pages.
Su, F. et al., "Dimension Recognition and Geometry Reconstruction in Vectorization of Engineering Drawings", *IEEE*, 1:8, Dec. 8, 2001, pp. 710-716.
Das, A. et al., "Recognition and Integration of Dimension Sets in Vectorized Engineering Drawings", *Computer Vision and Image Understanding*, 68:1, Oct. 1, 1997, pp. 90-108.
Dori, D. et al., "From Engineering Drawings to 3D CAD Models: Are We Ready Now?", *Computer Aided Design*. 27:4, Apr. 1, 1995, 12 pages.
Dori. D. et al., "Vector-Based Segmentation of Text Connected to Graphics in Engineering Drawings", *Advances in Structural and Syntactical Pattern Recognition*, Aug. 20, 1996, pp. 322-331.
Dori, D. et al., "Segmentation and Recognition of Dimensioning Text from Engineering Drawings", *Computer Vision and Image Understanding*, 69:2, Feb. 1, 1998, pp. 196-201.
Das, A. et al., "Recognition of Dimension Sets and Integration with Vectorized Engineering Drawings", *IEEE*, 1:14, Aug. 14, 1995, pp. 347-350.

* cited by examiner

*Primary Examiner* — Yon Couso
(74) *Attorney, Agent, or Firm* — Sherr & Jiang, PLLC (57) ABSTRACT

There is provided an information processing apparatus including a selecting unit that selects figures from a candidate figure group based on recognition values obtained through character recognition with respect to an input image, and a display control unit that performs control to display the figures selected by the selecting unit.

12 Claims, 13 Drawing Sheets

SELECTED FIGURE

SELECT FIGURE HAVING ANGLE MOST SIMILAR TO RECOGNITION ANGLE

CANDIDATE FIGURE GROUP

↑ SELECT FIGURE HAVING SEGMENT LENGTH RATIO MOST SIMILAR TO RECOGNIZED SEGMENT LENGTH RATIO

INFORMATION PROCESSING APPARATUS, PROGRAM, AND INFORMATION PROCESSING METHOD

BACKGROUND

The present disclosure relates to an information processing apparatus, a program, and an information processing method.

Recently, various technologies have been suggested as technology for analyzing a read image and correcting slant in a manuscript in an apparatus reading the manuscript set in a copying machine, a facsimile, and an optical character reader (OCR) as an image (for example, refer to Japanese Laid-Open Patent Publication No. 5-143774). According to the technologies, the slant of the manuscript can be corrected by rotating the manuscript, according to the slant of the manuscript detected by analyzing the read image.

SUMMARY

However, although the slant of a manuscript can be corrected by rotating the document under a condition that the manuscript spread across a plane is read from the front side, the manuscript may not be spread across plane. For example, when the manuscript is bound (when the manuscript forms a part of a textbook or a magazine), the manuscript may be warped.

In addition, the manuscript is not necessarily read from the front side. For example, the manuscript may be read obliquely. In this case, correction is not correctly performed only by rotating the manuscript. Therefore, there is a demand for a method that can perform control to display figures corrected with high precision on the basis of figures in an input image.

According to an embodiment of the present disclosure, there is provided an information processing apparatus which includes a selecting unit that selects figures from a candidate figure group based on recognition values obtained through character recognition with respect to an input image and a display control unit that performs control to display the figures selected by the selecting unit.

According to another embodiment of the present disclosure, there is provided a program for causing a computer to function as an information processing apparatus which includes a selecting unit that selects figures from a candidate figure group based on recognition values obtained through character recognition with respect to an input image and a display control unit that performs control to display the figures selected by the selecting unit.

According to another embodiment of the present disclosure, there is provided an information processing method which includes selecting figures from a candidate figure group based on recognition values obtained through character recognition with respect to an input image and performing control to display the selected figures.

According to the embodiments of the present disclosure described above, control can be performed to display figures corrected with high precision based on figures in an input image.

DETAILED DESCRIPTION OF THE EMBODIMENT(S)

Hereinafter, preferred embodiments of the present disclosure will be described in detail with reference to the appended drawings. Note that, in the present disclosure and the appended drawings, structural elements that have substantially the same function and structure are denoted with the same reference numerals, and repeated explanation of these structural elements is omitted.

The following description will be made in the order described below.

1. Embodiment
   1-1. Outline of Information Processing Apparatus
   1-2. Configuration Example of Information Processing Apparatus
   1-3. Flow of Operation of Information Processing Apparatus
2. Conclusion <1. Embodiment>

[1-1. Outline of Information Processing Apparatus]

Figure 1:
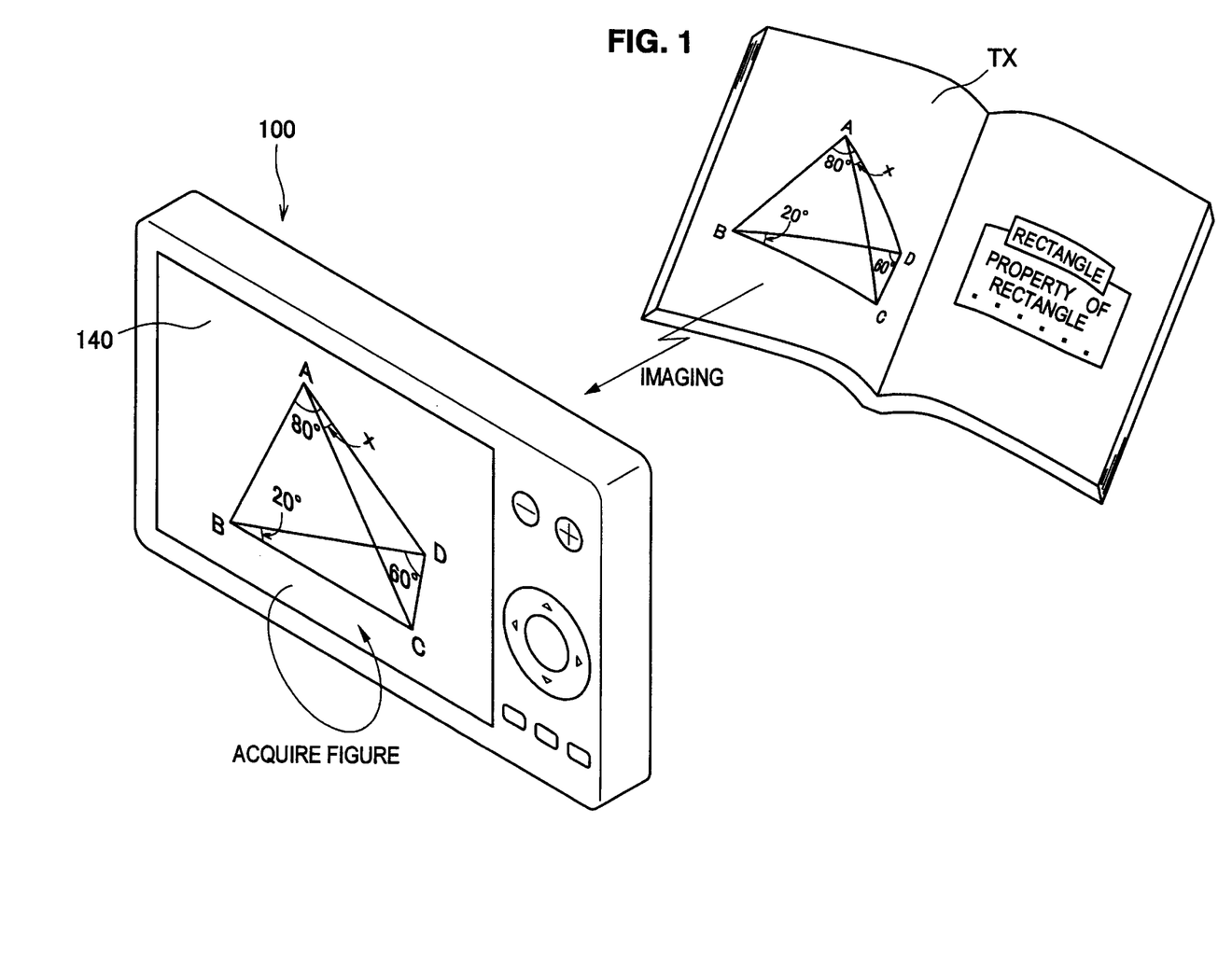
FIG. 1 is a diagram illustrating an outline of an information processing apparatus according to an embodiment of the present disclosure.

First, an information processing apparatus according to an embodiment of the present disclosure will be described. FIG. 1 is a diagram illustrating an outline of the information processing apparatus according to the embodiment of the present disclosure. As illustrated in FIG. 1, an information processing apparatus 100 according to the embodiment of the present disclosure mainly has a function of acquiring an imaging image as an input image and acquiring figures from the acquired input image. The information processing apparatus 100 can perform control such that the figures are displayed by a display device 140.

The figures are provided, for example, in a textbook TX and the information processing apparatus 100 acquires an imaging image obtained by imaging the figures provided in the textbook TX as an input image. The location at which the figures are provided is not limited to the textbook TX and the figures may be provided at any location at which imaging can be performed. The location at which the figures are provided is not particularly limited. For example, the figures may be provided in a magazine or a book.

The information processing apparatus 100 according to the embodiment of the present disclosure may be an apparatus of an arbitrary type such as a digital still camera, a smart phone, a personal computer (PC), or an image scanner. The information processing apparatus 100 according to the embodiment of the present disclosure may be an information processing module that is mounted to the above-described apparatus.

[1-2. Configuration Example of Information Processing Apparatus]

Figure 2:
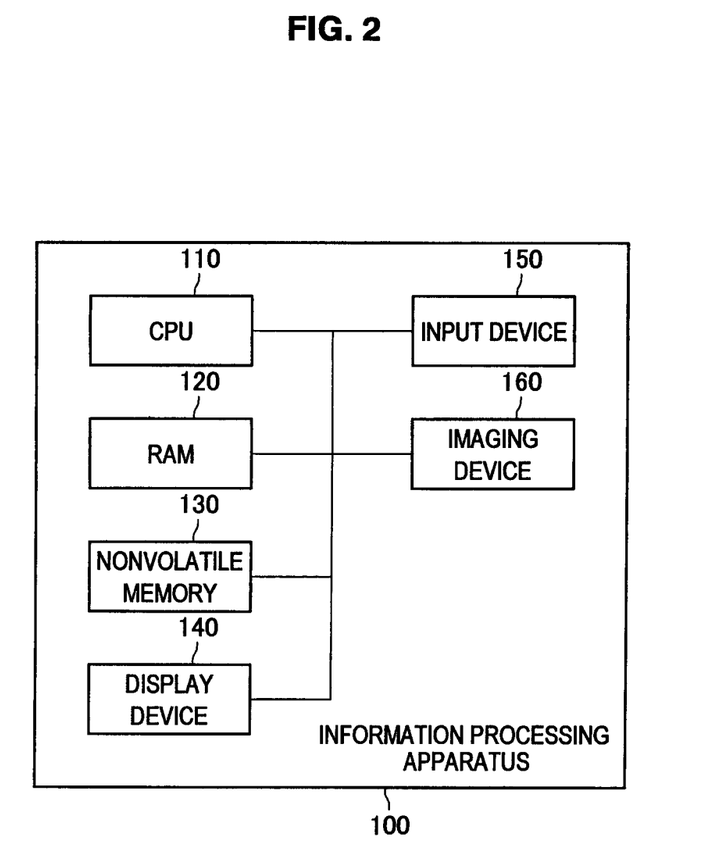
FIG. 2 is a diagram illustrating a hardware configuration of the information processing apparatus.

Next, a configuration example of the information processing apparatus 100 will be described. FIG. 2 is a diagram illustrating a hardware configuration of the information processing apparatus 100. As illustrated in FIG. 2, the information processing apparatus 100 includes a CPU 110, a RAM 120, a nonvolatile memory 130, a display device 140, an input device 150, and an imaging device 160.

The nonvolatile memory 130 is a data storage device that is configured as an example of a storage unit of the information processing apparatus 100. For example, the nonvolatile memory 130 is configured using a magnetic storage device such as a hard disk drive (HDD), a semiconductor storage device, an optical storage device, or a magneto optical storage device. The nonvolatile memory 130 stores a program executed by the CPU 110 or various data used in execution of the program.

The RAM 120 stores a program executed by the CPU 110 or a parameter used in execution of the program.

The CPU 110 functions as an arithmetic processing device and a control device and controls a part or all of operations in the information processing apparatus 100, according to various programs stored in the nonvolatile memory 130 and the RAM 120. The CPU 110 is configured as an example of a control unit of the information processing apparatus 100.

The display device 140 is configured using a device such as a liquid crystal display (LCD) and an organic electroluminescence (EL) display device that can visually notify a user of information. The display device 140 outputs a result obtained through various processing executed by the information processing apparatus 100. Specifically, the display device 140 displays the result obtained through the various processing executed by the information processing apparatus 100 with text or an image.

The input device 150 outputs an operation obtained from the user as a signal to the CPU 110. The user of the information processing apparatus 100 operates the input device 150 and can input various data to the information processing apparatus 100 or instruct the information processing apparatus 100 to execute a processing operation. The input device 150 is configured using a touch panel. However, a type of the input device 150 is not particularly limited. For example, the input device 150 may be configured using a device such as a mouse or a keyboard.

The imaging device 160 images an imaging object using an imaging element such as a charge coupled device (CCD) or a complementary metal oxide semiconductor (CMOS) and generates an imaging image. In the embodiment of the present disclosure, the imaging device 160 forms a part of the information processing apparatus 100. However, the imaging device 160 may be configured to be separated from the information processing apparatus 100.

Figure 3:
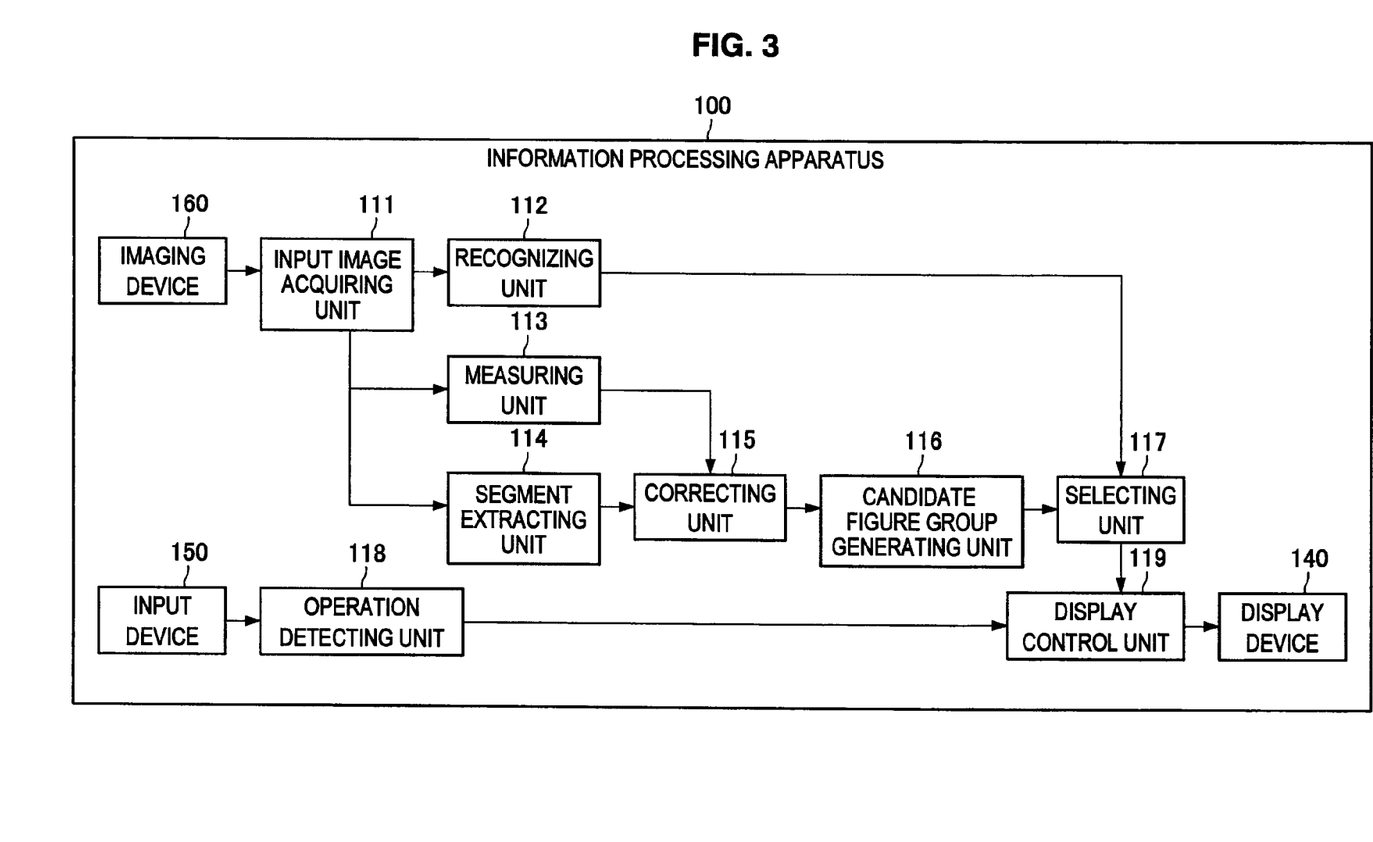
FIG. 3 is a diagram illustrating a functional configuration of the information processing apparatus.

FIG. 3 is a diagram illustrating a functional configuration of the information processing apparatus 100. As illustrated in FIG. 3, the information processing apparatus 100 includes an input image acquiring unit 111, a recognizing unit 112, a measuring unit 113, a segment extracting unit 114, a correcting unit 115, a candidate figure group generating unit 116, a selecting unit 117, an operation detecting unit 118, and a display control unit 119. As illustrated in FIG. 3, the nonvolatile memory 130, the imaging device 160, the input device 150, and the display device 140 may be included in the information processing apparatus 100 and may be included outside the information processing apparatus 100.

The input image acquiring unit 111 acquires an imaging image obtained through imaging by the imaging device 160 as an input image. The image that is imaged by the imaging device 160 may be a still image or a moving image. For example, if the user performs an imaging operation in an imaging direction toward the textbook TX, an image is imaged by the imaging device 160. The imaging image includes the figures. The input image that is obtained by the input image acquiring unit 111 is output to the recognizing unit 112, the measuring unit 113, and the segment extracting unit 114.

Figure 4:
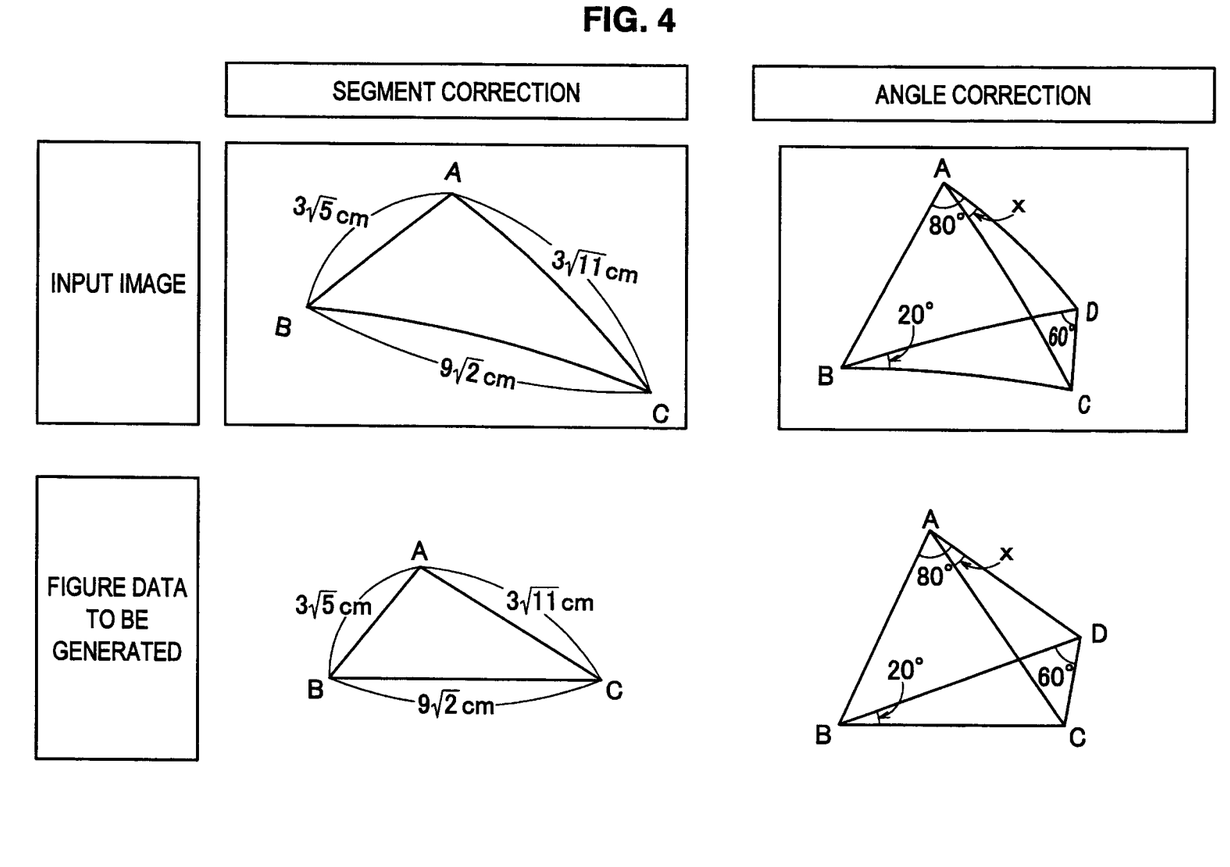
FIG. 4 is a diagram illustrating a comparison result of an input image and figure data generated by the information processing apparatus.

In this case, figure data that is generated by the information processing apparatus 100 on the basis of the input image acquired by the input image acquiring unit 111 will be described. FIG. 4 is a diagram illustrating a comparison result of the input image and the figure data generated by the information processing apparatus 100.

As illustrated in FIG. 4, it is assumed that figures of imaging objects are warped in the input image. As described above, when the imaging objects are provided on a plane of paper bound such as the textbook TX, a degree of warping is particularly increased. According to the embodiment of the present disclosure, as illustrated in "segment correction" of FIG. 4, figure data that is generated on the basis of segment lengths recognized from the input image can be generated. According to the embodiment of the present disclosure, as illustrated in "angle correction" of FIG. 4, figure data that is generated on the basis of angles recognized from the input image can be generated.

Hereinafter, an example of the case in which the figure data generated on the basis of the angles recognized from the input image is generated will be described as a first example. An example of the case in which the figure data generated on the basis of the segment lengths recognized from the input image is generated will be described as a second example.

Figure 5:
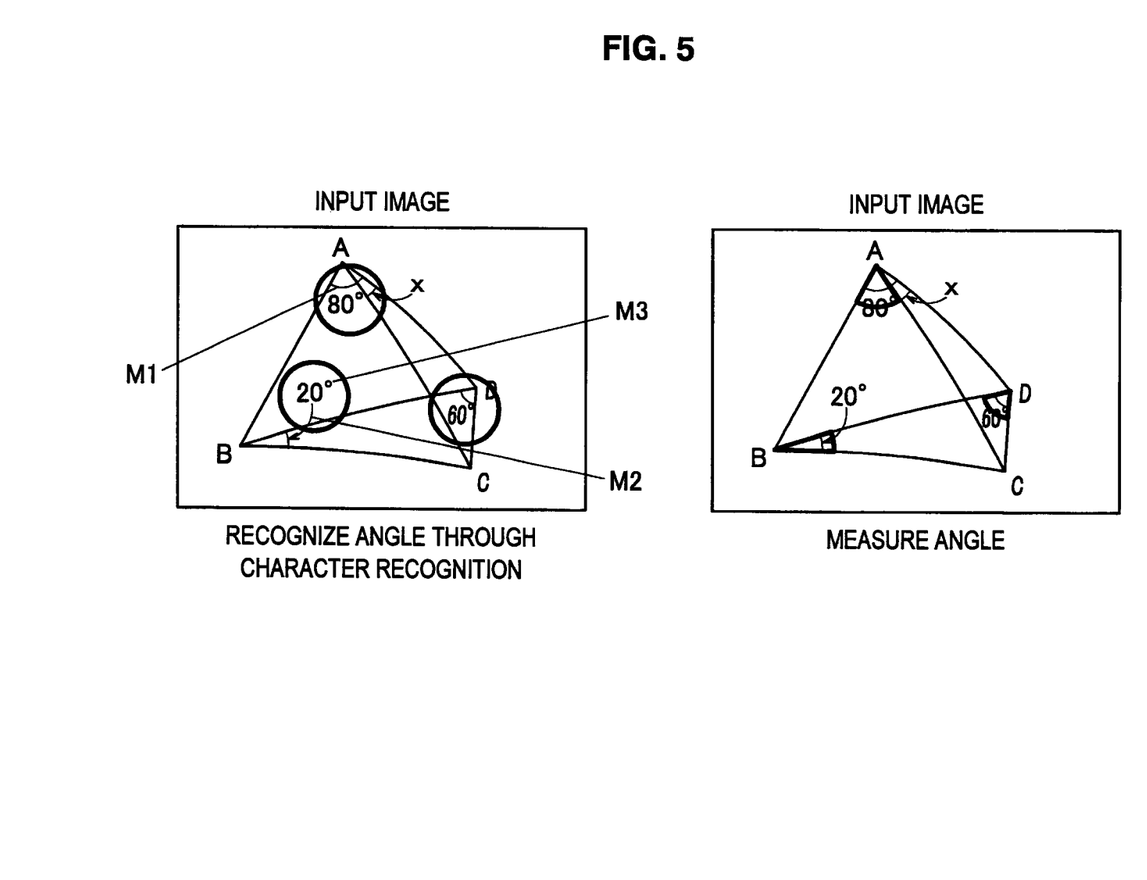
FIG. 5 is a diagram illustrating a recognizing unit and a measuring unit in a first example.

FIG. 5 is a diagram illustrating the recognizing unit 112 and the measuring unit 113 in the first example. As illustrated in FIG. 5, the recognizing unit 112 acquires recognition values from the input image through character recognition. In the character recognition, a general OCR technique can be applied. When the recognizing unit 112 recognizes the angles as the recognition values, the recognizing unit 112 may recognize marks such as a mark M1 given to the angle, a mark M2 given to indicate the angle, and a mark M3 showing a unit of an angle, and recognize angles corresponding to the recognized marks.

As illustrated in FIG. 5, if the recognizing unit 112 recognizes the mark M1, the recognizing unit 112 can recognize an angle "80" corresponding to the mark M1. According to the same principle, the recognizing unit 112 can recognize angles "20" and "60." If the recognizing unit 112 recognizes the mark M2, the recognizing unit 112 can recognize the angle "20" corresponding to the mark M2. If the recognizing unit 112 recognizes the mark M3, the recognizing unit 112 can recognize the angle "60" corresponding to the mark M3.

As illustrated in FIG. 5, the measuring unit 113 measures predetermined parameters as measurement values from the input image. When the angles are recognized by the recognizing unit 112, the predetermined parameters correspond to the angles. In an example illustrated in FIG. 5, the measuring unit 113 measures the angles "80," "20," and "60" that correspond to the angles recognized by the recognizing unit 112. However, the angles that are measured by the measuring unit 113 may not be the angles that correspond to the angles recognized by the recognizing unit 112.

Figure 6:
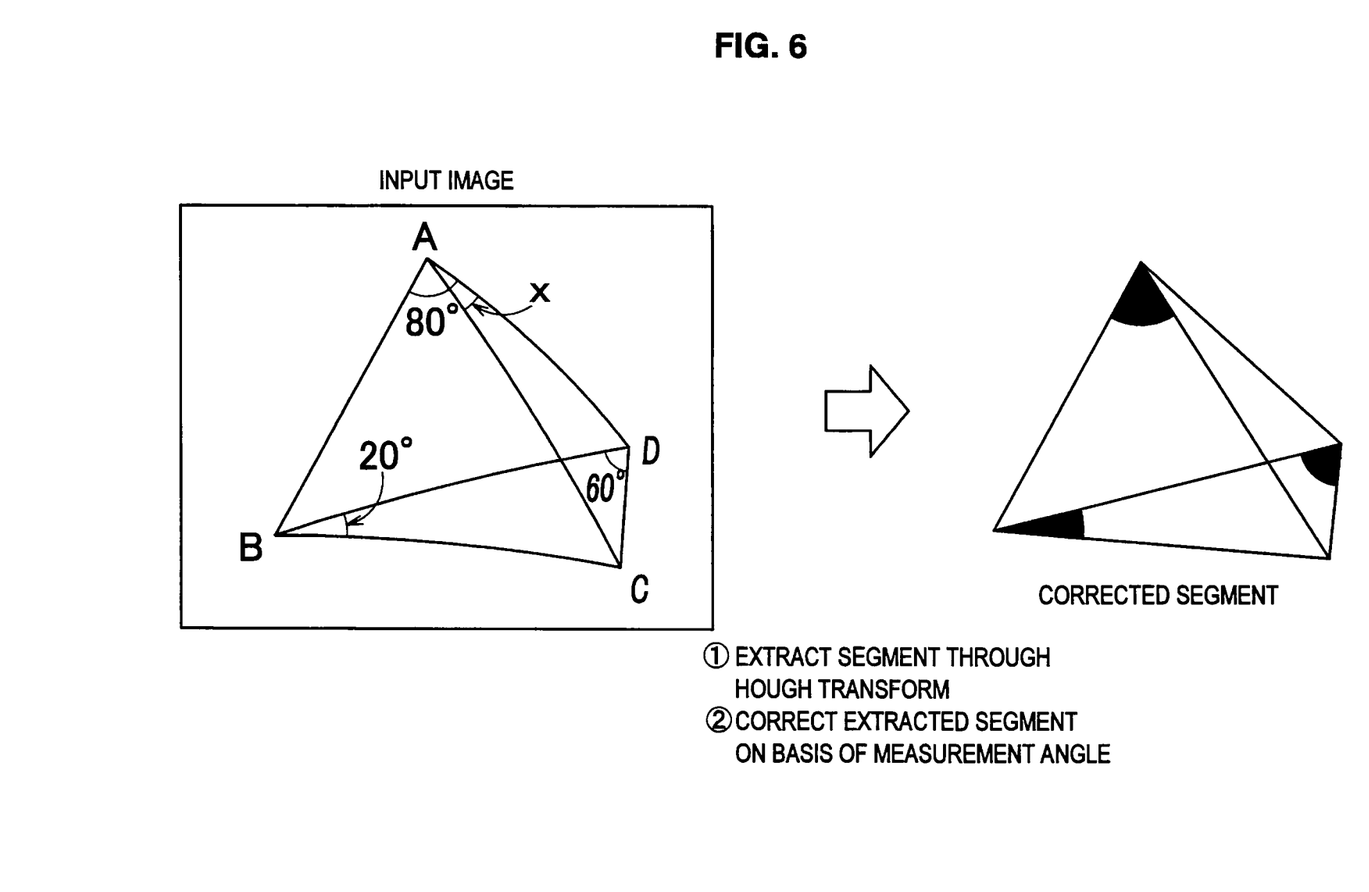
FIG. 6 is a diagram illustrating a segment extracting unit and a correcting unit in the first example.

FIG. 6 is a diagram illustrating the segment extracting unit 114 and the correcting unit 115 in the first example. The segment extracting unit 114 extracts segments from the input image. The number of extracted segments is not particularly limited. In an example illustrated in FIG. 6, the segment extracting unit 114 extracts segments AB, BC, CD, DA, AC, and BD from the input image. When the segments are extracted by the segment extracting unit 114, a Hough transform can be used. According to the Hough transform, even when the segments in the input image are cut in the middle or when there is noise in the input image, the segments can be extracted with high precision.

The correcting unit 115 corrects the segments that are extracted by the segment extracting unit 114. In particular, because it is assumed that there is an error in the segments extracted by the segment extracting unit 114, the error can be decreased by correcting the segments with the correcting unit 115. For example, the correcting unit 115 can correct the segments on the basis of the measurement values measured by the measuring unit 113. In the example illustrated in FIG. 6, the correcting unit 115 corrects the segments on the basis of the measurement angles measured by the measuring unit 113.

In detail, the correcting unit 115 selects measurement values most similar to the magnitudes of the angles generated with the segments extracted by the segment extracting unit 114, from the measurement values measured by the measuring unit 113, and corrects the segments such that the magnitudes of the angles are matched with the selected measurement values. The figures illustrated in FIG. 6 as the "corrected segments" are an example of the segments corrected by the correcting unit 115. However, the warp decreases as compared with the input image.

Figure 7:
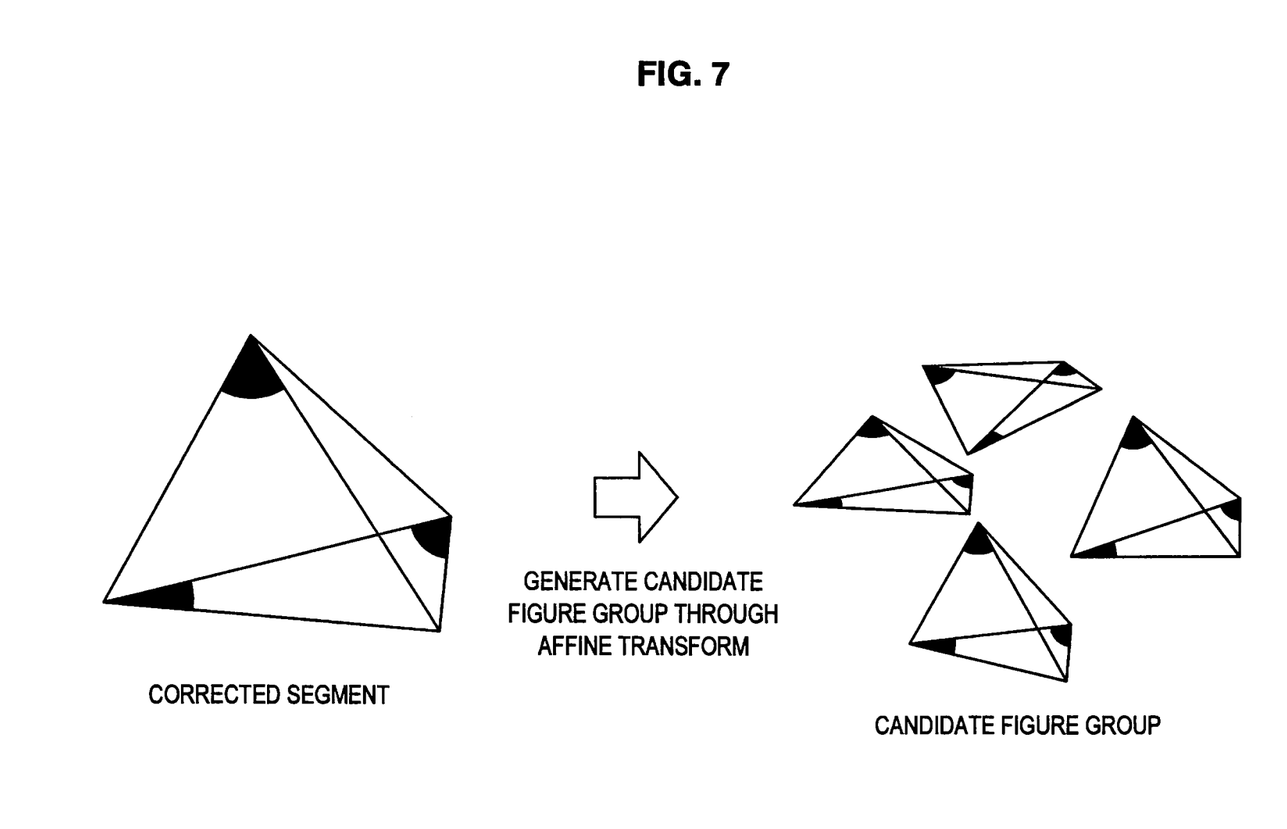
FIG. 7 is a diagram illustrating a candidate figure group generating unit in the first example.

FIG. 7 is a diagram illustrating the candidate figure group generating unit 116 in the first example. The candidate figure group generating unit 116 generates a candidate figure group on the basis of the segments corrected by the correcting unit 115. The candidate figure group generating unit 116 may generate a candidate figure group through an affine transform on the basis of the segments corrected by the correcting unit 115. If the affine transform is used, various candidate figures such as a rotated figure, a horizontally inverted figure, an enlarged figure, and a reduced figure can be generated while a geometric property of the segments corrected by the correcting unit 115 is maintained.

The number of candidate figures that are included in the candidate figure groups is not particularly limited. In an example illustrated in FIG. 7, the candidate figure group generating unit 116 generates candidate figure groups that correspond to four candidate figures. Instead, the candidate figure group generating unit 116 may generate figure groups obtained by rotating the segments corrected by the correcting unit 115 about a predetermined axis using each integer in a range of "0" to "360" as an angle, as the candidate figure groups. The predetermined axis may be a single axis (for example, an X axis), two axes (for example, XY axes), or three axes (for example, XYZ axes).

Figure 8:
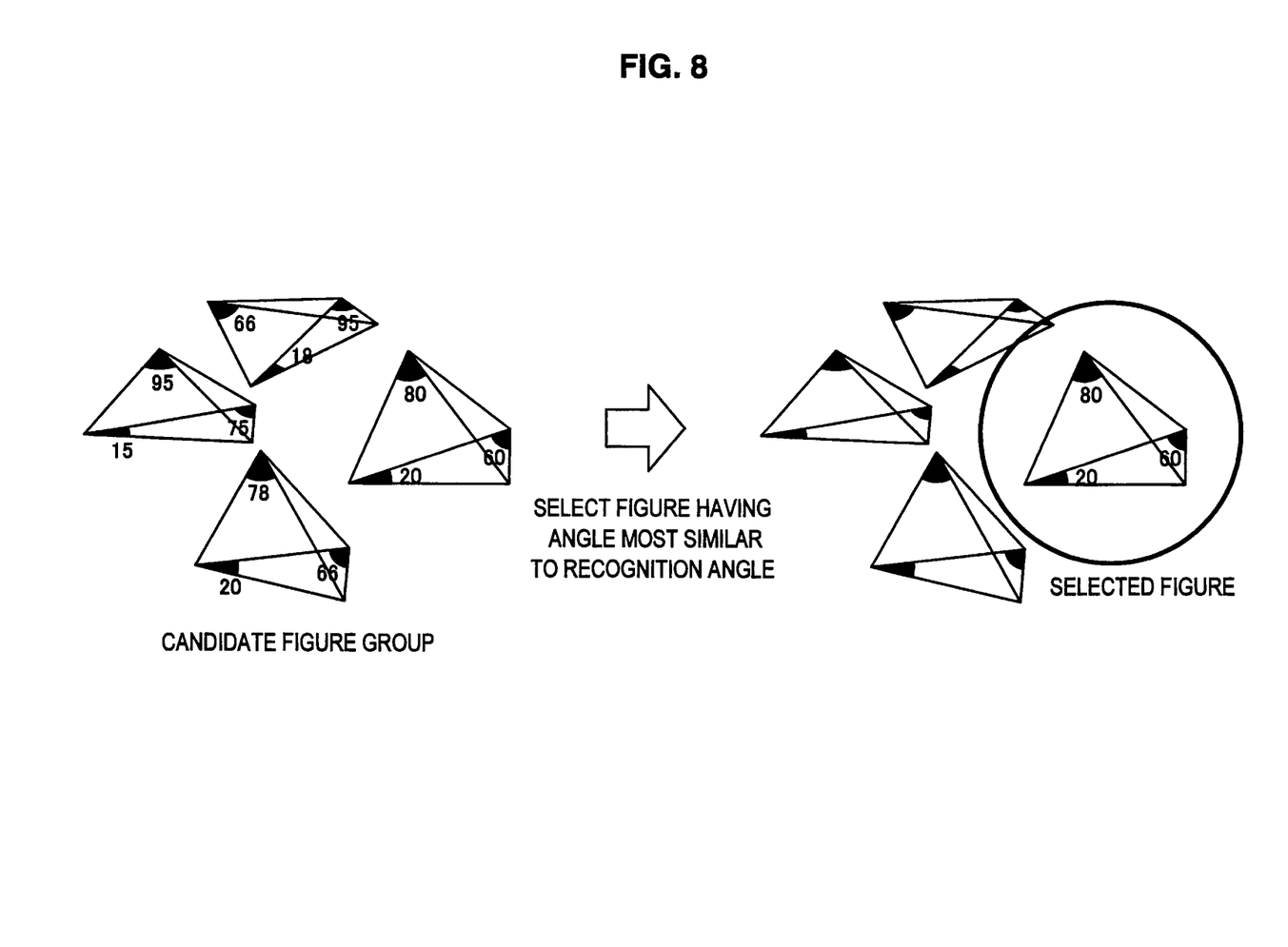
FIG. 8 is a diagram illustrating a selecting unit in the first example.

FIG. 8 is a diagram illustrating the selecting unit 117 in the first example. The selecting unit 117 selects the figures from the candidate figure groups on the basis of recognition values obtained through character recognition with respect to the input image. In the first example, the angles are recognized as the recognition values. Therefore, the selecting unit 117 selects the figures from the candidate figure groups on the basis of the recognition angles. In detail, the selecting unit 117 selects the figures having angles most similar to the recognition angles by matching with each candidate figure included in the candidate figure groups.

As the figures that have the most similar angles, the candidate figures that have angles for which a sum of difference values with the recognition angles is smallest can be selected. In an example illustrated in FIG. 8, when the recognition angles are "80," "20," and "60," the selecting unit 117 selects the figures that have the angles "80," "20," and "60" that are most similar to the recognition angles "80," "20," and "60."

Returning to FIG. 3, the description is continued. The display control unit 119 performs control to display the figures selected by the selecting unit 117. For example, the display control unit 119 controls the display device 140 to display the figures selected by the selecting unit 117. The display device 140 can display the figures according to the control from the display control unit 119. At this time, the displayed figures are the figures that are corrected with high precision on the basis of the figures in the input image.

The operation detecting unit 118 detects an operation input from the user through the input device 150. The display control unit 119 can control the display on the basis of the operation detected by the operation detecting unit 118. For example, if the input image display operation is detected by the operation detecting unit 118, the display control unit 119 can perform control to display the input image. If the correction image display operation is detected by the operation detecting unit 118, the display control unit 119 can perform control to display the figures selected by the selecting unit 117.

Figure 9:
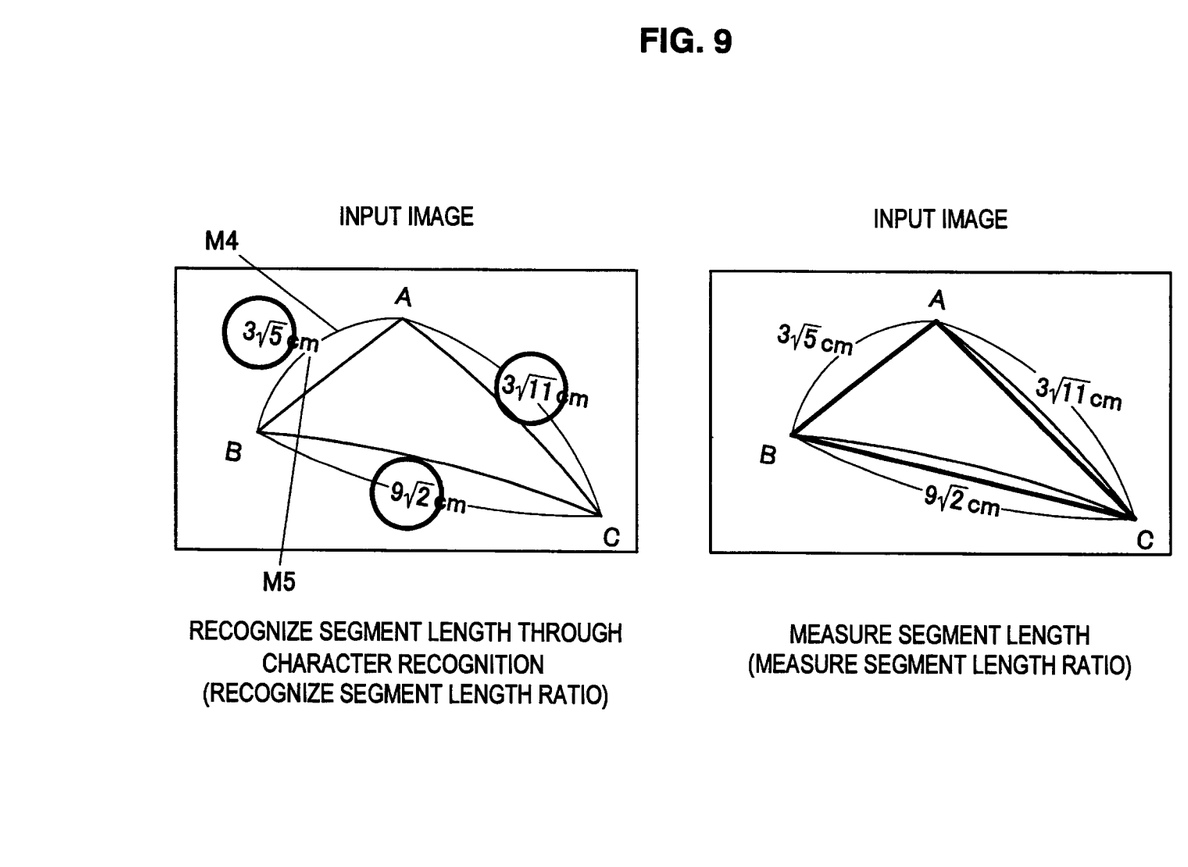
FIG. 9 is a diagram illustrating a recognizing unit and a measuring unit in a second example.

FIG. 9 is a diagram illustrating the recognizing unit 112 and the measuring unit 113 in the second example. As described in the first example, the recognizing unit 112 acquires the recognition values through the character recognition from the input image. In the character recognition, the general OCR technique can be applied. When the recognizing unit 112 recognizes the segment lengths as the recognition values, the recognizing unit 112 may recognize marks such as a mark M4 given to the segment and a mark M5 showing a unit of segment length, and may recognize the segment lengths corresponding to the recognized marks.

As illustrated in FIG. 9, if the recognizing unit 112 recognizes the mark M1, the recognizing unit 112 can recognize the angle "80" corresponding to the mark M1. According to the same principle, the recognizing unit 112 can recognize the angles "20" and "60." If the recognizing unit 112 recognizes the mark M4, the recognizing unit 112 can recognize the segment length "3√5" corresponding to the mark M4. If the recognizing unit 112 recognizes the mark M5, the recognizing unit 112 can recognize the segment length "3√5" corresponding to the mark M5.

As illustrated in FIG. 9, the measuring unit 113 measures the predetermined parameters as the measurement values from the input image. The predetermined parameters correspond to the segment lengths, when the segment lengths are recognized by the recognizing unit 112. In the example illustrated in FIG. 9, the measuring unit 113 measures the segment lengths "3√5," "9√2," and "3√11" that correspond to the segment lengths recognized by the recognizing unit 112. However, the segment lengths that are measured by the measuring unit 113 may not be the segment lengths that correspond to the segment lengths recognized by the recognizing unit 112.

Figure 10:
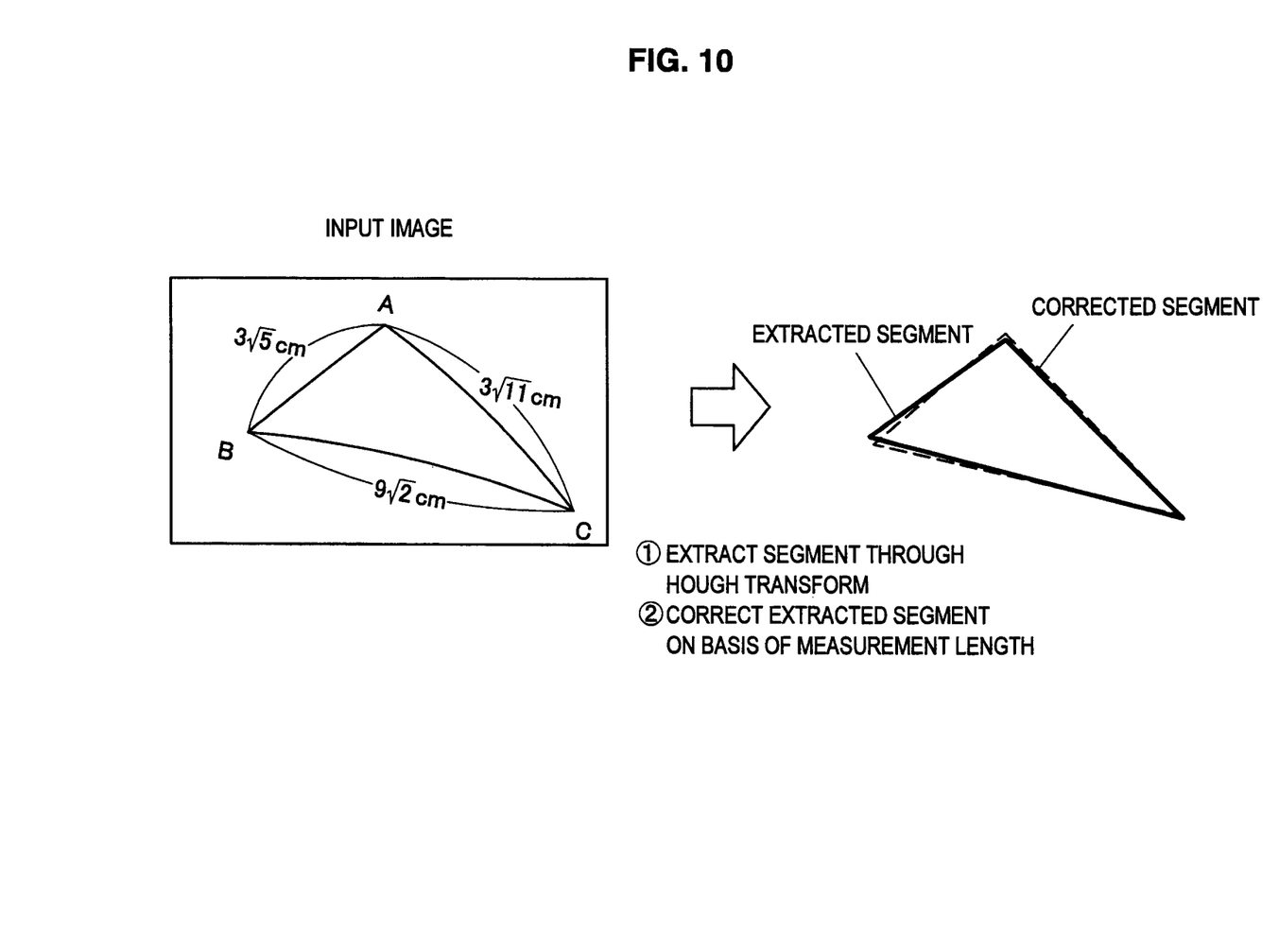
FIG. 10 is a diagram illustrating a segment extracting unit and a correcting unit in the second example.

FIG. 10 is a diagram illustrating the segment extracting unit 114 and the correcting unit 115 in the second example. Similar to the first example, the segment extracting unit 114 extracts the segments from the input image. The number of extracted segments is not particularly limited. In an example illustrated in FIG. 10, the segment extracting unit 114 extracts the segments AB, BC, and CA from the input image. When the segments are extracted by the segment extracting unit 114, a Hough transform can be used. According to the Hough transform, even when the segments in the input image are cut in the middle or when there is noise in the input image, the segments can be extracted with high precision.

The correcting unit 115 corrects the segments that are extracted by the segment extracting unit 114. In particular, because it is assumed that there is an error in the segments extracted by the segment extracting unit 114, the error can be decreased by correcting the segments with the correcting unit 115. For example, the correcting unit 115 can correct the segments on the basis of the measurement values measured by the measuring unit 113. In the example illustrated in FIG. 10, the correcting unit 115 corrects the segments on the basis of the measurement lengths measured by the measuring unit 113.

In detail, the correcting unit 115 selects measurement values most similar to the lengths of the segments extracted by the segment extracting unit 114 from the measurement values measured by the measuring unit 113, and corrects the segments such that the segment lengths are matched with the selected measurement values. The figures illustrated in FIG. 10 as the "corrected segments" are an example of the segments corrected by the correcting unit 115. However, the warp decreases as compared with the input image.

Figure 11:
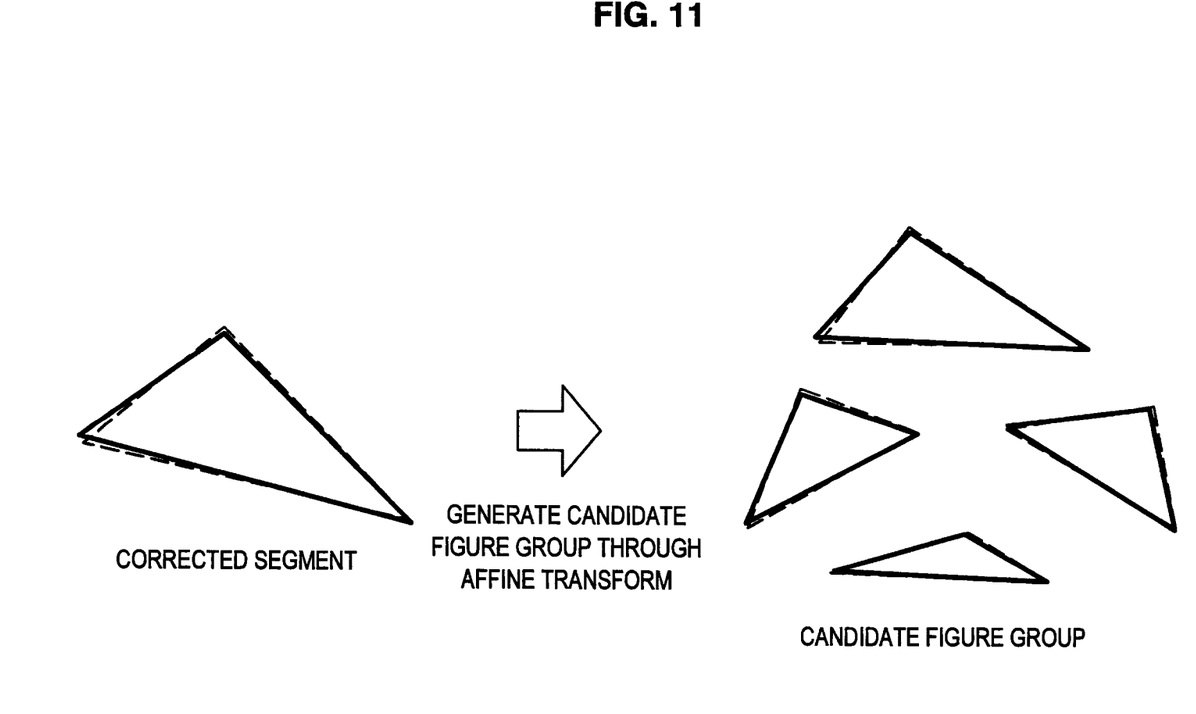
FIG. 11 is a diagram illustrating a candidate figure group generating unit in the second example.

FIG. 11 is a diagram illustrating the candidate figure group generating unit 116 in the second example. Similar to the first example, the candidate figure group generating unit 116 generates the candidate figure group on the basis of the segments corrected by the correcting unit 115. The candidate figure group generating unit 116 may generate the candidate figure group through an affine transform on the basis of the segments corrected by the correcting unit 115. If the affine transform is used, various candidate figures such as a rotated figure, a horizontally inverted figure, an enlarged figure, and a reduced figure can be generated while a geometric property of the segments corrected by the correcting unit 115 is maintained.

The number of candidate figures that are included in the candidate figure groups is not limited in particular. In an example illustrated in FIG. 11, the candidate figure group generating unit 116 generates candidate figure groups that correspond to four candidate figures. Instead, the candidate figure group generating unit 116 may generate figure groups obtained by rotating the segments corrected by the correcting unit 115 about a predetermined axis using each integer in a range of "0" to "360" as an angle, as the candidate figure groups. The predetermined axis may be a single axis (for example, an X axis), two axes (for example, XY axes), or three axes (for example, XYZ axes).

Figure 12:
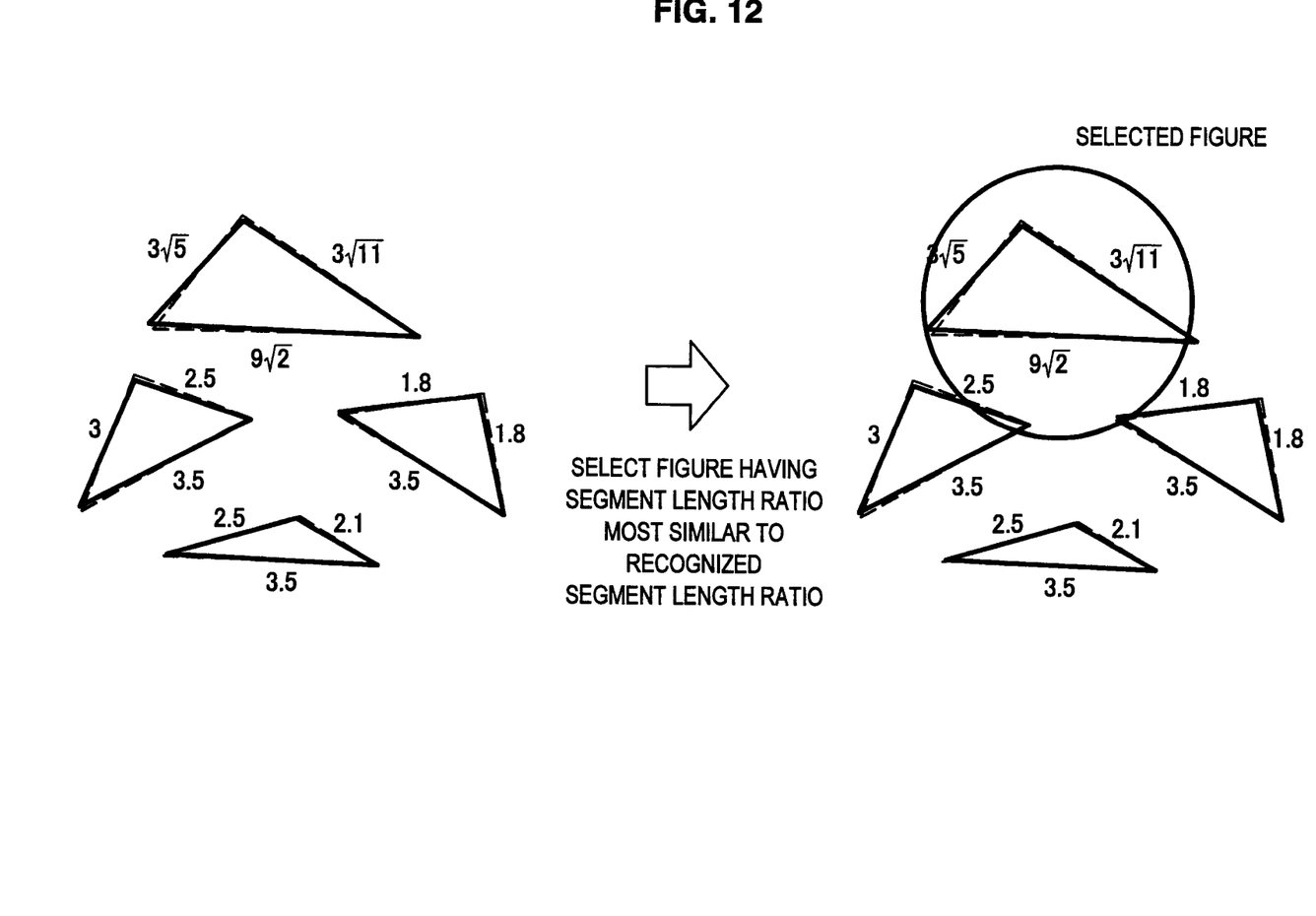
FIG. 12 is a diagram illustrating a selecting unit in the second example.

FIG. 12 is a diagram illustrating the selecting unit 117 in the second example. The selecting unit 117 selects the figures from the candidate figure groups on the basis of the recognition values obtained through the character recognition with respect to the input image. In the second example, the segment lengths are recognized as the recognition values. Therefore, the selecting unit 117 selects the figures from the candidate figure groups on the basis of ratios of the recognized segment lengths (ratio of each recognized segment length). In detail, the selecting unit 117 selects the figures having ratios of the segment lengths most similar to the ratios of the segment lengths (ratio of each recognized segment length) by matching with each candidate figure included in the candidate figure groups.

As the figures that have the most similar segment length ratios, the candidate figures that have the segment length ratios for which a sum of difference values with the segment length ratios is smallest can be selected. In an example illustrated in FIG. 12, when the segment length ratios are "$3\sqrt{5}:9\sqrt{2}:3\sqrt{11}$," the selecting unit 117 selects the figures that have segment length ratios "$3\sqrt{5}:9\sqrt{2}:3\sqrt{11}$" that are most similar to the segment length ratios "$3\sqrt{5}:9\sqrt{2}:3\sqrt{11}$."

Returning to FIG. 3, the description is continued. Similar to the first example, the display control unit 119 performs control to display the figures selected by the selecting unit 117. For example, the display control unit 119 controls the display device 140 to display the figures selected by the selecting unit 117. The display device 140 can display the figures according to the control from the display control unit 119. At this time, the displayed figures are the figures that are corrected with high precision on the basis of the figures in the input image.

The operation detecting unit 118 detects an operation input from the user through the input device 150. The display control unit 119 can control the display on the basis of the operation detected by the operation detecting unit 118. For example, if the input image display operation is detected by the operation detecting unit 118, the display control unit 119 can perform control to display the input image. If the correction image display operation is detected by the operation detecting unit 118, the display control unit 119 can perform control to display the figures selected by the selecting unit 117.

[1-3. Flow of Operation of Information Processing Apparatus]

Figure 13:
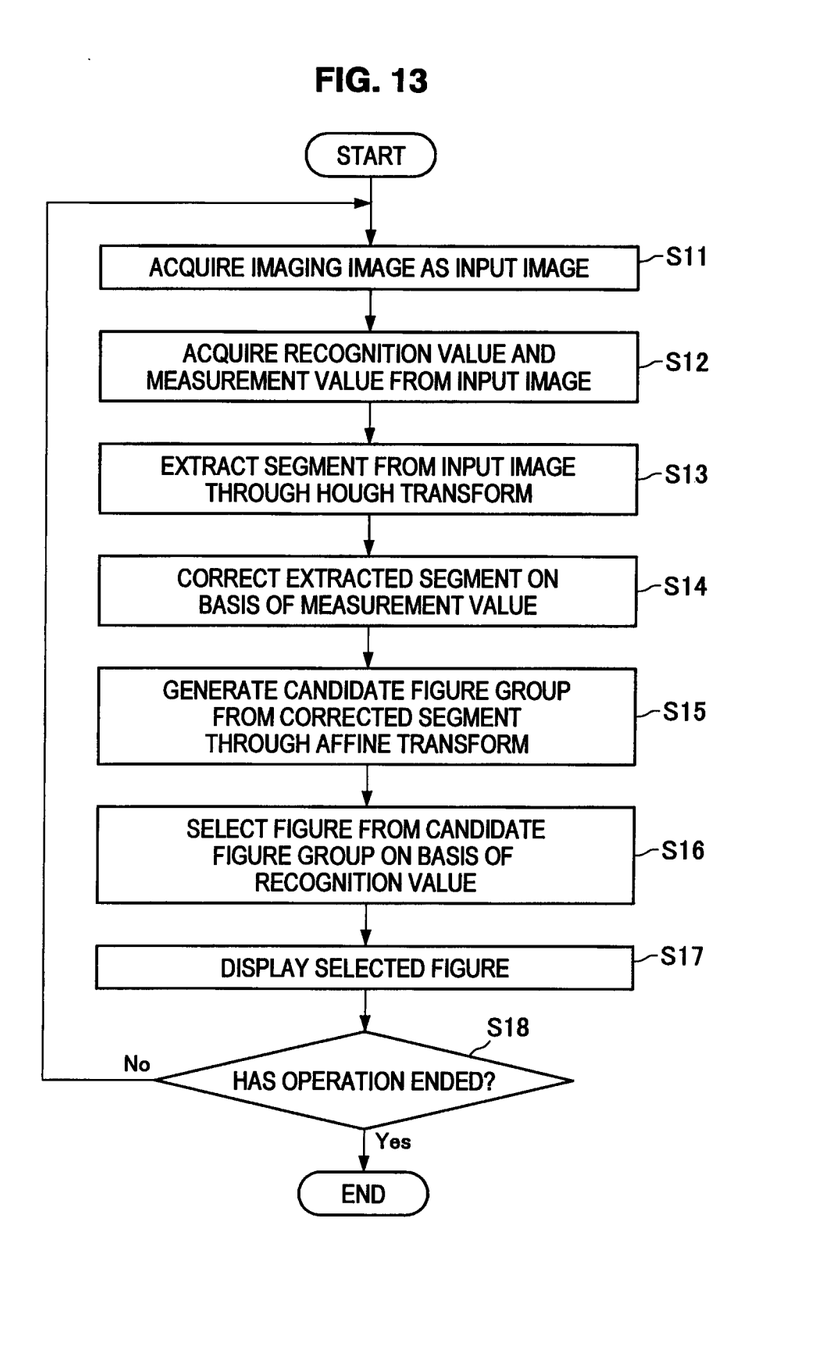
FIG. 13 is a flowchart illustrating an example of a flow of an operation of the information processing apparatus.

FIG. 13 is a flowchart illustrating an example of a flow of an operation of the information processing apparatus 100. First, the input image acquiring unit 111 acquires the imaging image as the input image (step S11). The recognizing unit 112 acquires the recognition values through the character recognition from the input image and the measuring unit 113 acquires the measurement values from the input image (step S12). Next, the segment extracting unit 114 extracts the segments from the input image through the Hough transform (step S13). The correcting unit 115 corrects the segments extracted by the segment extracting unit 114 on the basis of the measurement values (step S14).

The candidate figure group generating unit 116 generates the candidate figure group from the corrected segments through the amine transform (step S15). The selecting unit 117 selects the figures from the candidate figure group on the basis of the recognition values (step S16). The display control unit 119 performs control to display the figures selected by the selecting unit 117 (step S17). The display device 140 can display the figures according to the control from the display control unit 119.

When the operation ends ("Yes" in step S18), the operation ends. When the operation is continued ("No" in step S18), the process returns to step S11 and the operation is continued.

<3. Conclusion>

According to the embodiment described in the present disclosure, the figures can be selected from the candidate figure group on the basis of the recognition values obtained through the character recognition with respect to the input image, and the control can be performed to display the selected figures. Therefore, the control can be performed to display the figures corrected with high precision on the basis of the figures in the input image. In particular, the functions can be realized by recognizing the angles in the first example and recognizing the segment lengths in the second example.

The series of control processes described in the present disclosure can be realized using any one of software, hardware, and a combination of software and hardware. Each program forming the software is previously stored in a computer readable recording medium that is provided inside or outside each apparatus. Each program is read in a random access memory (RAM) and is executed by a processor such as a central processing unit (CPU), at the time of execution.

The preferred embodiments of the present disclosure have been described in detail with reference to the appended drawings. However, a technical range of the present disclosure is not limited to the above examples. It will be apparent to those skilled in the art that various modifications and changes can be made without departing from the technical scope and spirit defined by the appended claims. Therefore, it should be understood that the various modifications and changes are included in the technical range of the present disclosure.

The following configuration is included in the technical range of the present disclosure.

(1) An information processing apparatus including a selecting unit that selects figures from a candidate figure group based on recognition values obtained through character recognition with respect to an input image, and a display control unit that performs control to display the figures selected by the selecting unit.

(2) The information processing apparatus according to (1), further including a segment extracting unit that extracts segments from the input image, a correcting unit that corrects the segments extracted by the segment extracting unit, and a candidate figure group generating unit that generates the candidate figure group based on the segments corrected by the correcting unit.

(3) The information processing apparatus according to (2), wherein the segment extracting unit extracts the segments from the input image through a Hough transform.

(4) The information processing apparatus according to (2) or (3), further including a measuring unit that measures predetermined parameters as measurement values from the input image, wherein the correcting unit corrects the segments extracted by the segment extracting unit based on the measurement values measured by the measuring unit.

(5) The information processing apparatus according to any one of (2) to (4), wherein the candidate figure group generating unit generates the candidate figure group through an affine transform based on the segments corrected by the correcting unit.

(6) The information processing apparatus according to any one of (1) to (5), further including a recognizing unit that acquires the recognition values from the input image through the character recognition.

(7) A program for causing a computer to function as an information processing apparatus including a selecting unit that selects figures from a candidate figure group based on recognition values obtained through character recognition with respect to an input image, and a display control unit that performs control to display the figures selected by the selecting unit.

(8) The program according to (7), wherein the information processing apparatus further includes a segment extracting unit that extracts segments from the input image, a correcting unit that corrects the segments extracted by the segment extracting unit, and a candidate figure group generating unit that generates the candidate figure group based on the segments corrected by the correcting unit.

(9) The program according to (8), wherein the segment extracting unit extracts the segments from the input image through a Hough transform.

(10) The program according to (8) or (9), wherein the information processing apparatus further includes a measuring unit that measures predetermined parameters as measurement values from the input image and wherein the correcting unit corrects the segments extracted by the segment extracting unit based on the measurement values measured by the measuring unit.

(11) The program according to any one of (8) to (10), wherein the candidate figure group generating unit generates the candidate figure group through an affine transform based on the segments corrected by the correcting unit.

(12). The program according to any one of (7) to (11), wherein the information processing apparatus further includes a recognizing unit that acquires the recognition values from the input image through the character recognition.

(13) An information processing method including selecting figures from a candidate figure group based on recognition values obtained through character recognition with respect to an input image, and performing control to display the selected figures.

The present disclosure contains subject matter related to that disclosed in Japanese Priority Patent Application JP 2011-127446 filed in the Japan Patent Office on Jun. 7, 2011, the entire content of which is hereby incorporated by reference.

What is claimed is:

1. An information processing apparatus comprising:
   a selecting unit that selects figures from a candidate figure group based on recognition values obtained through character recognition with respect to an input image;
   a display control unit that performs control to display the figures selected by the selecting unit;
   a segment extracting unit that extracts segments from the input image through a Hough transform;
   a correcting unit that corrects the segments extracted by the segment extracting unit; and
   a candidate figure group generating unit that generates the candidate figure group based on the segments corrected by the correcting unit.

2. The information processing apparatus according to claim 1, further comprising:
   a measuring unit that measures predetermined parameters as measurement values from the input image,
   wherein the correcting unit corrects the segments extracted by the segment extracting unit based on the measurement values measured by the measuring unit.

3. The information processing apparatus according to claim 1,
   wherein the candidate figure group generating unit generates the candidate figure group through an affine transform based on the segments corrected by the correcting unit.

4. The information processing apparatus according to claim 1, further comprising:
   a recognizing unit that acquires the recognition values from the input image through the character recognition.

5. A non-transitory computer-readable medium having embodied thereon a program, which when executed by a processor of computer causes the processor to function as an information processing apparatus including:
   a selecting unit that selects figures from a candidate figure group based on recognition values obtained through character recognition with respect to an input image;
   a display control unit that performs control to display the figures selected by the selecting unit;
   a segment extracting unit that extracts segments from the input image through a Hough transform;
   a correcting unit that corrects the segments extracted by the segment extracting unit; and a candidate figure group generating unit that generates the candidate figure group based on the segments corrected by the correcting unit.

6. The non-transitory computer-readable medium according to claim 5,
wherein the information processing apparatus further includes a measuring unit that measures predetermined parameters as measurement values from the input image, and
wherein the correcting unit corrects the segments extracted by the segment extracting unit based on the measurement values measured by the measuring unit.

7. The non-transitory computer-readable medium according to claim 5,
wherein the candidate figure group generating unit generates the candidate figure group through an affine transform based on the segments corrected by the correcting unit.

8. The non-transitory computer-readable medium according to claim 5,
wherein the information processing apparatus further includes a recognizing unit that acquires the recognition values from the input image through the character recognition.

9. An information processing method using at least one processor, comprising:
selecting figures from a candidate figure group based on recognition values obtained through character recognition with respect to an input image using the at least one processor;
performing control to display the selected figures using the at least one processor;
extracting segments from the input image through a Hough transform using the at least one processor;
correcting the segments extracted by the segment extracting unit using the at least one processor; and
generating the candidate figure group based on the segments corrected by the correcting unit using the at least one processor.

10. The information processing method according to claim 9, comprising:
measuring predetermined parameters as measurement values from the input image using the at least one processor, and
correcting the extracted segments based on the measured measurement values using the at least one processor.

11. The information processing method according to claim 9, comprising:
generating the candidate figure group through an affine transform based on the corrected segments using the at least one processor.

12. The information processing method according to claim 9, comprising:
acquiring the recognition values from the input image through the character recognition using the at least one processor.

\* \* \* \* \*